United States Patent
Kataoka et al.

(10) Patent No.: US 11,208,153 B2
(45) Date of Patent: Dec. 28, 2021

(54) FRONT VEHICLE-BODY STRUCTURE OF VEHICLE

(71) Applicant: MAZDA MOTOR CORPORATION, Hiroshima (JP)

(72) Inventors: Yuki Kataoka, Hiroshima (JP); Kazuki Yamauchi, Aki-gun (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 8 days.

(21) Appl. No.: 16/817,909

(22) Filed: Mar. 13, 2020

(65) Prior Publication Data

US 2020/0307702 A1   Oct. 1, 2020

(30) Foreign Application Priority Data

Mar. 27, 2019   (JP) .............................. JP2019-059986

(51) Int. Cl.
*B62D 25/08* (2006.01)
*B62D 21/15* (2006.01)
*B62D 25/04* (2006.01)
*B62D 25/16* (2006.01)

(52) U.S. Cl.
CPC ........... *B62D 25/08* (2013.01); *B62D 21/152* (2013.01); *B62D 25/04* (2013.01); *B62D 25/16* (2013.01)

(58) Field of Classification Search
CPC ........ B62D 25/16; B62D 25/04; B62D 25/08; B62D 21/152; B62D 21/155

USPC ............. 296/187.09, 187.1, 203.01, 203.02, 296/193.06

See application file for complete search history.

(56) References Cited

U.S. PATENT DOCUMENTS

| 5,275,436 A * | 1/1994 | Pomero ................... B60R 21/00 180/232 |
| 9,394,005 B1 * | 7/2016 | Enders ................. B62D 21/152 |
| 2015/0001884 A1 * | 1/2015 | Saje ..................... B22D 17/002 296/193.06 |
| 2016/0083015 A1 | 3/2016 | Kiyoshita et al. |
| 2017/0203793 A1 | 7/2017 | Nakamura et al. |

FOREIGN PATENT DOCUMENTS

JP           2016-060401 A      4/2016

* cited by examiner

*Primary Examiner* — Dennis H Pedder
(74) *Attorney, Agent, or Firm* — Studebaker & Brackett PC

(57) ABSTRACT

A connecting reinforcement is provided between a hinge pillar and a wheel house so as to reinforce at least around a rear face portion of the wheel house. The connecting reinforcement extends in the vertical direction along a rear face portion of the wheel house and has a closed-cross section space, in a sectional view perpendicular to the vertical direction, inside thereof. A gusset including a slant face portion which is provided at a front face thereof and configured to extend obliquely rearwardly-and-outwardly is provided in the closed-cross section space. A gap space which forms a part of the closed-cross section space is provided between the slant face portion and the rear face portion of the wheel house provided on a wheel-house side so as to face the slant face portion.

13 Claims, 7 Drawing Sheets

FRONT VEHICLE-BODY STRUCTURE OF VEHICLE

BACKGROUND OF THE INVENTION

The present invention relates to a front vehicle-body structure of a vehicle which comprises a hinge pillar extending in a vertical direction and a front wheel house (hereafter, referred to as "wheel house") provided to be spaced forwardly apart from the hinge pillar.

A front vehicle-body structure of a vehicle in which a device for suppressing a front wheel from retreating to reduce a degree (amount) of the front wheel's coming into a cabin in a small-overlap collision of the vehicle is applied is known as shown in Japanese Patent Laid-Open Publication No. 2016-60401 (its counterpart: U.S. Patent Application Publication No. 2016/0083015 A1), for example.

According to the structure disclosed in the above-described patent document, a hinge bracket (15) as a reinforcing member (gusset), which includes a front-side vertical wall portion (15b) which is provided at a front face thereof and configured to extend obliquely rearwardly, in a vehicle longitudinal direction, and outwardly, in a vehicle width direction (i.e., extend obliquely rearwardly-and-outwardly), is provided inside a hinge pillar, whereby the retreating front wheel is displaced (so-called glances off) outwardly in the vehicle width direction by the front-side vertical wall portion (15b) (see paragraphs nos. [0019], [0027] and FIG. 2 in the Japanese publication).

Herein, in general, the front wheel is supported via a suspension link, so that the front wheel retreats in the small-overlap collision of the vehicle, rotating inwardly in the vehicle width direction around a support point of the suspension link to a vehicle body or in accordance with breaking of the suspension link.

In particular, in a vehicle, such as a rear-wheel drive vehicle in which an engine is arranged longitudinally (i.e., in the vehicle longitudinal direction), the wheel house tends to be further spaced forwardly apart from the hinge pillar, compared to a case of a vehicle equipped with a laterally-arranged engine (i.e., an engine arranged in the vehicle width direction). Thus, there is a case where the distance between the hinge pillar and the wheel house is long because of a powertrain layout described above or a design of the vehicle. In this case, since there is a concern that the front wheel and the like may improperly come into not only the cabin but a vehicle-body front inside part, such as an engine room or dash panel, it is necessary to devise a countermeasure for appropriate glancing-off of the front wheel.

SUMMARY OF THE INVENTION

Accordingly, an object of the present invention is to provide a front vehicle-body structure of a vehicle which can properly suppress the front wheel's retreating in the small-overlap collision of the vehicle by securely making the front wheel glance off.

The present invention is a front vehicle-body structure of a vehicle, comprising a hinge pillar extending in a vertical direction, a wheel house provided to be spaced forwardly apart from the hinge pillar, a gusset provided between the hinge pillar and the wheel house, the gusset including a slant face portion which is provided at a front face thereof and configured to extend obliquely rearwardly-and-outwardly, and an impact absorbing member which is provided in a vicinity of the gusset and configured to absorb impact which the gusset receives from a front wheel retreating in a small-overlap collision of the vehicle.

According to the present invention, the front wheel retreating in the small-overlap collision of the vehicle can be securely made to glance off.

Specifically, since the gusset is positioned on a wheel-house side (i.e., on a forward side, in the vehicle longitudinal direction) of the hinge pillar, the front wheel retreating in the small-overlap collision can be received by this gusset and thereby made to glance off at an earlier timing, compared to a case where the gusset is placed inside the hinge pillar, for example.

Meanwhile, while there is a concern that the impact which the gusset receives from the front wheel may become large because the gusset receives the front wheel retreating at the earlier timing as described above, the impact absorbing member is provided so in the vicinity of the gusset that this impact can be properly reduced. Accordingly, the front wheel retreating in the small-overlap collision of the vehicle can be securely made to glance off.

Herein, the above-described impact absorbing member may be configured such that the front wheel retreating in the small-overlap collision comes to hit against the impact absorbing member after its hitting against the gusset, not limited to before its hitting against the gusset. Specifically, while it is preferable that the impact absorbing member be provided between the hinge pillar and the wheel house, it may be provided at a side sill or the hinge pillar.

In an embodiment of the present invention, the impact absorbing member is constituted by a closed-cross section structure to reinforce at least around a rear face portion of the wheel house, the closed-cross section structure extends in the vertical direction along the rear face portion of the wheel house and has a closed-cross section space, in a sectional view perpendicular to the vertical direction, inside thereof, the gusset is provided in the closed-cross section space, and a gap space which forms a part of the closed-cross section space is provided between the slant face portion and a constituting face of the closed-cross section structure which is provided on a side of the wheel house so as to face the slant face portion.

According to this embodiment, the closed-cross section structure absorbs the impact of the front wheel retreating toward the cabin in the small-overlap collision at a position located on the forward side of the hinge pillar so as to decrease a retreating speed of the front wheel, and then the glancing-off of the front wheel retreating is securely attained by the slant face portion of the gusset. Thereby, the front wheel's retreating in the small-overlap collision can be properly suppressed.

In another embodiment of the present invention, an opening portion is formed at a gusset-corresponding portion of the constituting face of the closed-cross section structure which faces the gusset in the vertical direction, the opening portion being configured to be opened from the closed-cross section space to an outside of the closed-cross section structure, and a reinforcing portion is provided around the opening portion formed at the gusset-corresponding portion so as to reinforce a portion around the opening portion.

According to this embodiment, the productivity or the maintenance performance can be improved by using the above-described opening potion as a work opening for spot welding (i.e., as a hole through which a welding gun is inserted) or a service hole for maintenance, and also deterioration of the rigidity of the portion around this opening portion, which may be caused by forming this opening portion, can be suppressed by the reinforcing portion, such as a rib structure.

In another embodiment of the present invention, a reinforcing portion is provided at a portion of the constituting face of the closed-cross section structure which is located above a gusset-corresponding portion of the constituting face of the closed-cross section structure which faces the gusset in the vertical direction so as to reinforce the portion located above the gusset-corresponding portion.

According to this embodiment, further decreasing of the retreating speed of the front wheel by means of the closed-cross section structure can be attained by reinforcing the portion of the closed-cross section structure located above the gusset-corresponding portion by means of the reinforcing portion.

In another embodiment of the present invention, a reinforcing portion is provided at a portion of the constituting face of the closed-cross section structure which is located below a gusset-corresponding portion of the constituting face of the closed-cross section structure which faces the gusset in the vertical direction so as to reinforce the portion located below the gusset-corresponding portion.

According to this embodiment, the further decreasing of the retreating speed of the front wheel by means of the closed-cross section structure can be attained by reinforcing the portion of the closed-cross section structure located below the gusset-corresponding portion by means of the reinforcing portion, such as a side-sill front-end reinforcing member.

The present invention will become apparent from the following description which refers to the accompanying drawings.

DETAILED DESCRIPTION OF THE INVENTION

Figure 1:
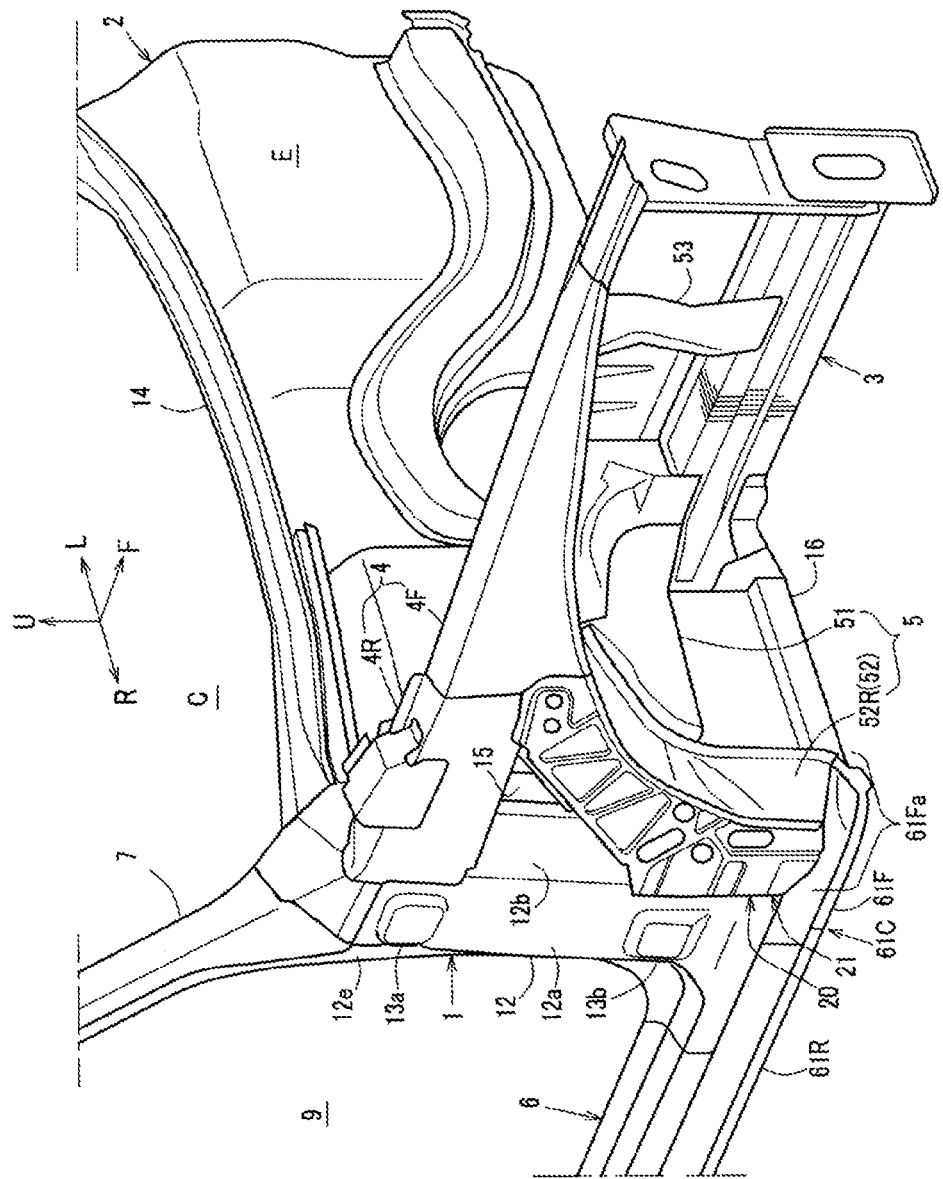
FIG. 1 is a perspective view of a major part of a front vehicle-body structure of an automotive vehicle of the present embodiment, when viewed from an upper-front rightward side.

Hereafter, an embodiment in which a front vehicle-body structure of the present invention is applied to a front-engine rear-drive (FR) type of automotive vehicle equipped with a longitudinally-arranged engine will be described referring to the drawings.

In the figures, an arrow F shows a forward (front) side of the automotive vehicle, an arrow R shows a rightward (right) side of the automotive vehicle, an arrow L shows a leftward (left) side of the automotive vehicle, and an arrow U shows an upward (upper) side of the automotive vehicle. While the followings will describe a right-side structure of the automotive vehicle, since a left-side structure of the automotive vehicle is similar to the right-side structure, description of the left-side structure of the automotive vehicle will be omitted except particular cases.

As shown in FIGS. 1-4, the automotive vehicle provided with the font vehicle-body structure of the embodiment comprises a pair of right-and-left hinge pillars 1, a dash panel 2, a pair of right-and-left front side frames 3, a pair of right-and-left apron reinforcement 4 (see FIGS. 1-3), a pair of right-and-left wheel houses 5, and a pair of right-and-left side sills 6.

The hinge pillar 1 extends in a vertical direction along a front edge of a side-door opening 9 of a cabin C, and comprises a hinge pillar inner 11 (see FIG. 4) and a hinge pillar outer 12 which is provided on an outside of the cabin C.

Figure 4:
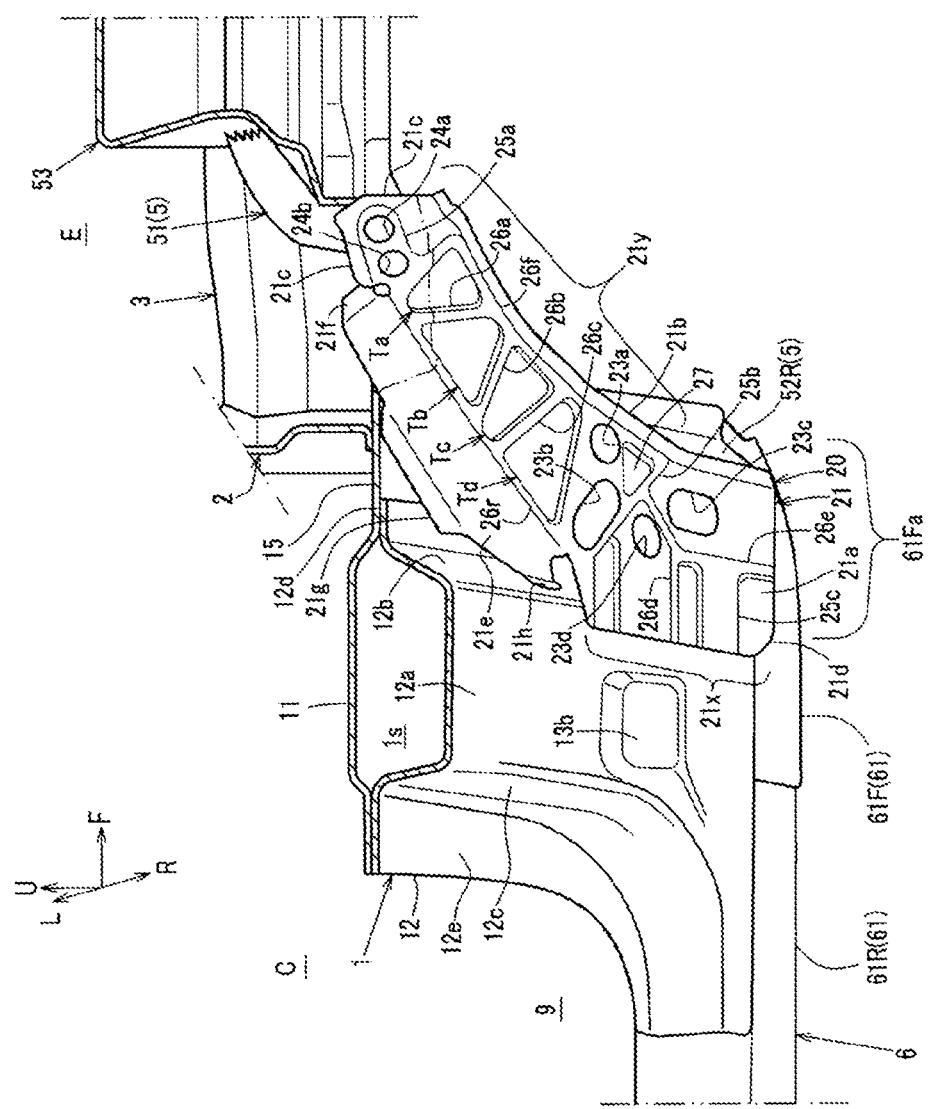
FIG. 4 is a perspective sectional view taken along line A-A of FIG. 3 without the connecting reinforcement.
Figure 6:
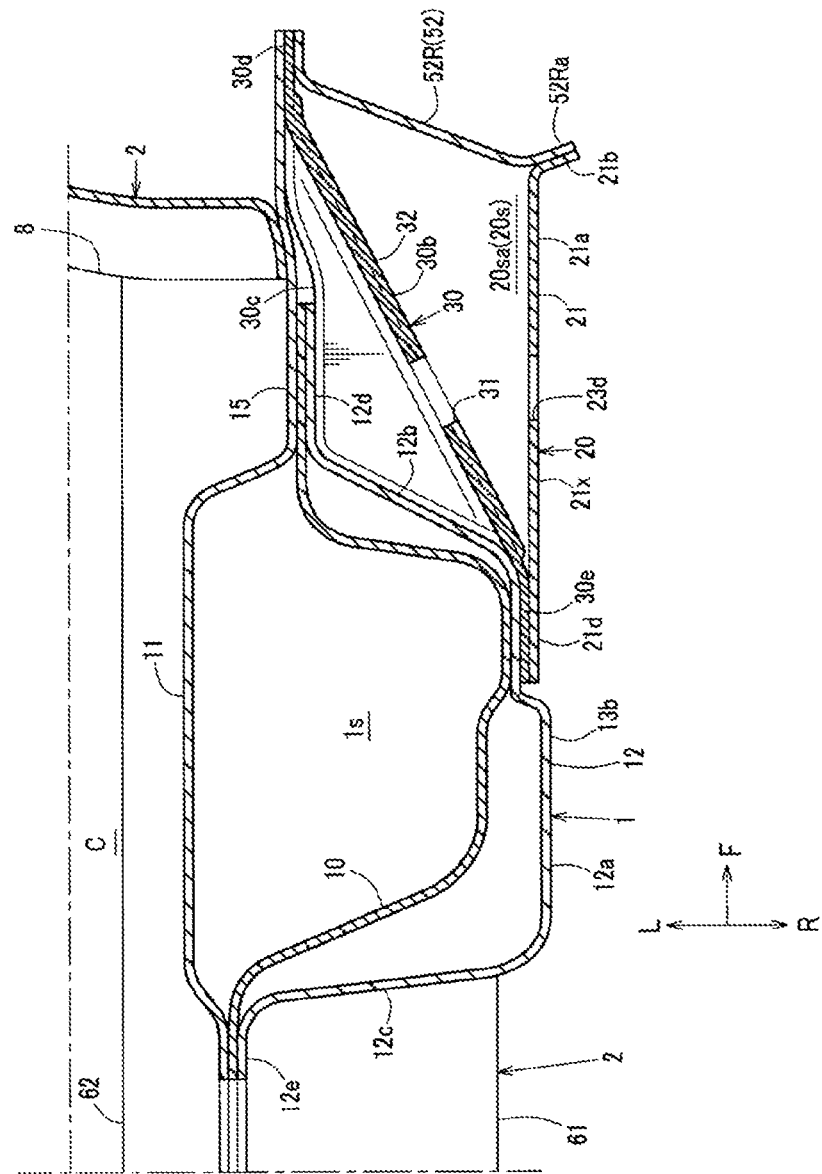
FIG. 6 is a sectional view taken along line C-C of FIG. 3.

As shown in FIGS. 4 and 6, the hinge pillar outer 12 is configured to have a hat-shaped cross section perpendicular to the vertical direction which is opened inwardly in a vehicle width direction, which is integrally formed by a side face portion 12a which is positioned on an outward side in the vehicle width direction, a front face portion 12b and a rear face portion 12c which respectively extend inwardly in the vehicle width direction from front-and-rear sides of the side face portion 12a, a front-side flange portion 12d which extends forwardly from the front face portion 12b, and a rear-side flange portion 12e which extends rearwardly from the rear face portion 12c.

Thus, the hinge pillar 1 has a closed-cross section space is therein which is formed between the hinge pillar outer 12 and the hinge pillar inner 11 and extends in the vertical direction.

Figure 2:
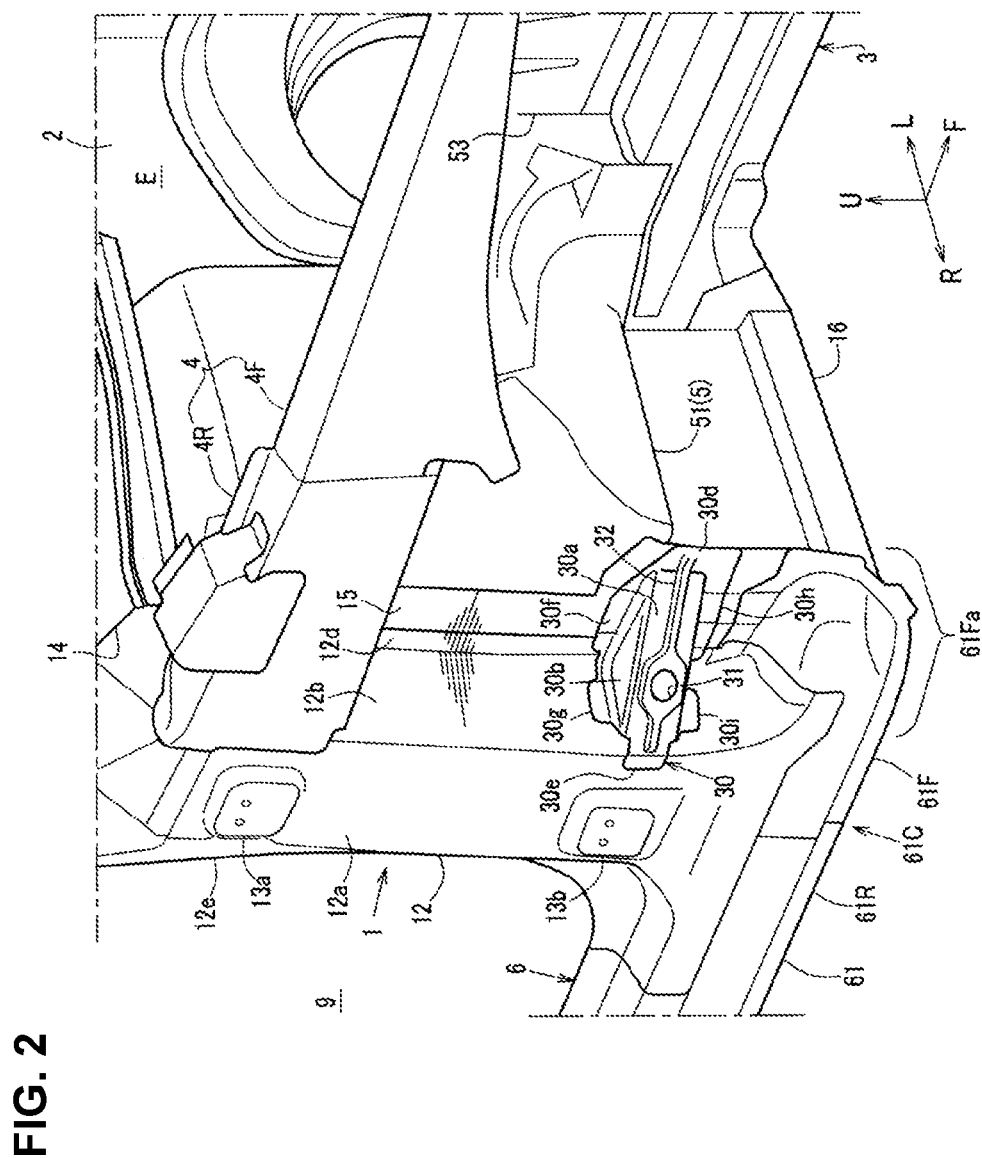
FIG. 2 is an enlarged view of a major part of FIG. 1 in a state where a connecting reinforcement is detached.
Figure 3:
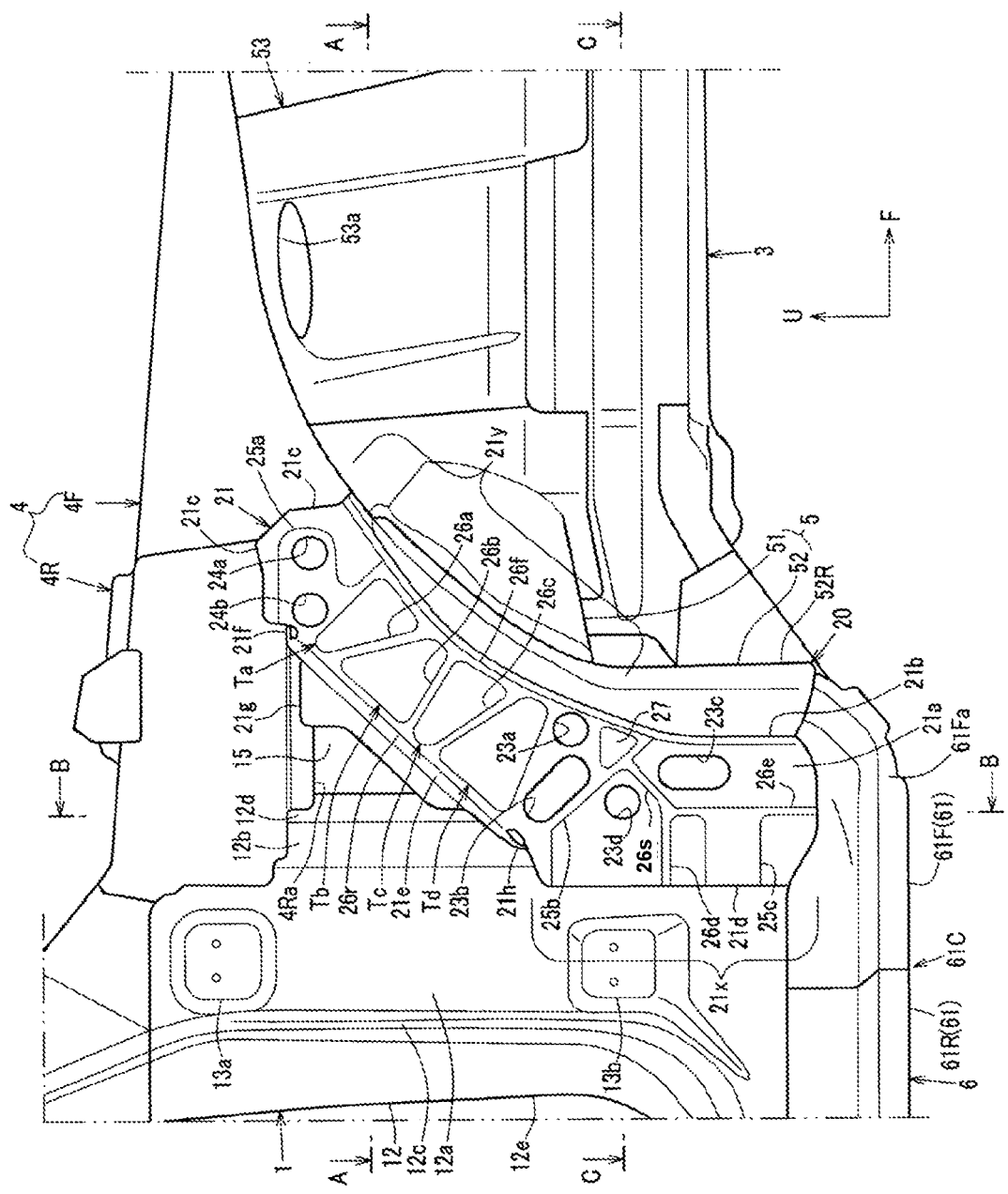
FIG. 3 is a right side view of the major part of the front vehicle-body structure of the automotive vehicle of the present embodiment.

A front side door, not illustrated, is pivotally supported at the hinge pillar 1 so that a side-door opening 9 is opened or closed therewith. Specifically, as shown in FIGS. 1-3, side-door attachment portions 13a, 13b where hinge brackets (not illustrated) provided at upper-and-lower sides of a front edge of the front side door are attached are provided at respective positions of the side face portion 12a of the hinge pillar 1 (the hinge pillar outer 12) which correspond to the hinge brackets. As shown in FIG. 6, the upper-and-lower side-door attachment portions 13a, 13b of the hinge pillar 1 are reinforced by hinge reinforcements 10 provided in the closed-cross section space is from an inward side, in the vehicle width direction, of the hinge pillar 1 so as to improve their support rigidity (the hinge reinforcement 10 for reinforcing the lower side-door attachment portion 13b is illustrated only in this figure). Herein, as shown in FIG. 1, a front pillar 7 which extends obliquely upwardly-and-rearwardly is joined to an upper end portion of the hinge pillar 1.

Figure 7:
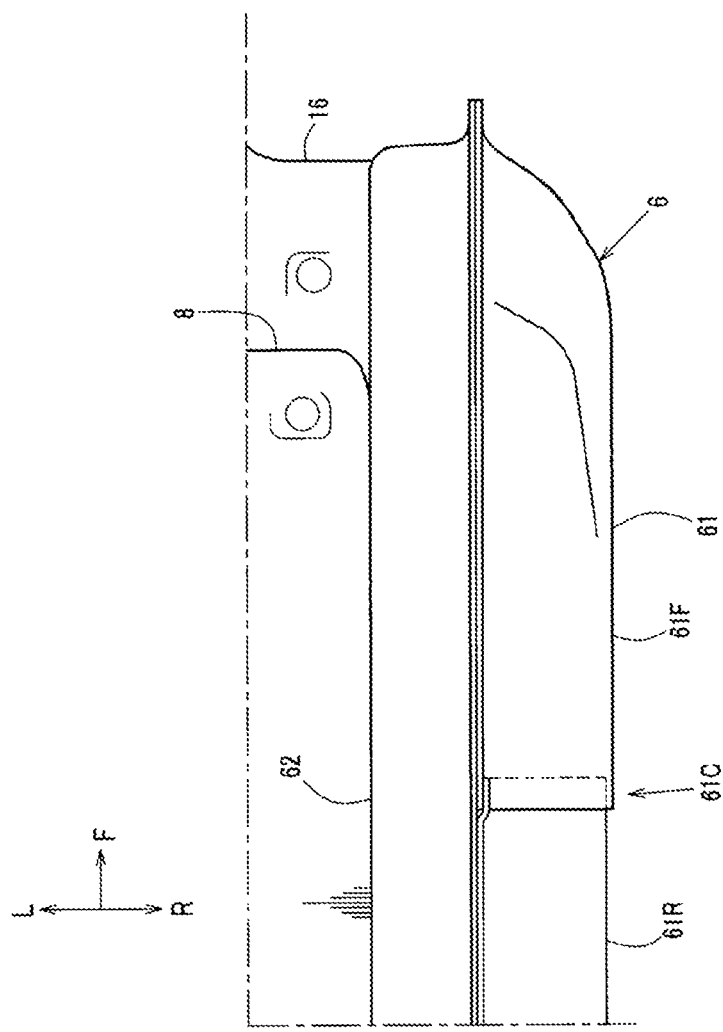
FIG. 7 is a bottom view of a front portion of a side sill.

As shown in FIG. 1, the dash panel 2 is formed in a vertical-wall shape and interconnects the right-and-left hinge pillars 1 in the vehicle width direction at a position located slightly in front of the hinge pillars 1 (see FIG. 4), and rearwardly partitions a cabin C from an engine room E. The dash panel 2 rises upwardly from a front end portion of a floor panel 8 (see FIGS. 5 and 6), and a cowl panel 14 which extends in the vehicle width direction (see FIG. 1) is joined to an upper portion of this dash panel 2. Herein, reference character 16 shown in FIGS. 2 and 7 denotes a torque box.

Further, in the automotive vehicle of the present embodiment, as shown in FIGS. 4 and 6, a side panel 15 which extends both in the vertical direction and in a longitudinal direction is disposed between the dash panel 2 and the hinge pillar outer 12. A portion of the side panel 15 which corresponds to the hinge pillar 1 in the longitudinal direction is configured to have a hat-shaped cross section perpendicular to the vertical direction which is opened to the outward side in the vehicle width direction as the above-described hinge pillar inner 11. That is, the side panel 15 is configured to include the hinge pillar inner 11.

As shown in FIG. 1, the front side frame 3 is provided to extend in the longitudinal direction in front of the dash panel 2. The front side frame 3 has a nearly-rectangular closed cross section (not illustrated) extending in the longitudinal direction therein.

The apron reinforcement 4 is provided on the outward side, in the vehicle width direction, and an upward side of the front side frame 3, and extends nearly horizontally in the vehicle longitudinal direction, having a closed cross section (not illustrated) therein.

The apron reinforcement 4 comprises an apron-reinforcement rear portion 4R extending forwardly from the upper end portion of the hinge pillar 1 and an apron-reinforcement front portion 4F extending forwardly from a front end of the apron-reinforcement rear portion 4R.

The wheel house 5 is provided to be spaced forwardly apart from the hinge pillar 1, and a front wheel (not illustrated) is accommodated (stored) in the wheel house 5. The wheel house 5 comprises a wheel house inner 51 and a wheel house outer 52 which are arranged on the inward side and on the outward side in the vehicle width direction, respectively. That is, a rear portion of the wheel house 5 is integrally joined to the side panel 15 such that the side panel 15 is interposed between the wheel house inner 51 and the wheel house outer 52.

As shown in FIGS. 1, 3 and 4, a rear face portion 52R of the wheel house outer 52 extends rearwardly, curving downwardly, so as to form a front face of a connecting reinforcement 20 (described later) which is provided on the rearward side of the wheel house outer 52. That is, the connecting reinforcement 20 described later is configured to include the rear face portion 52R of the wheel house outer 52.

As shown in FIGS. 1-4, a suspension housing 53 which accommodates a damper (not illustrated) as a suspension member for the front wheel is provided at a middle portion, in the vehicle longitudinal direction, of the wheel house inner 51.

The suspension housing 53 is attached such that it extends between the front side frame 3 and the apron-reinforcement front portion 4F, and a suspension top portion 53a as a suspension support portion (damper support portion) where an upper end portion of the damper is attached is provided at an upper portion of the suspension housing 53 which is positioned on the inward side, in the vehicle width direction, of the wheel house 5 as shown in FIG. 3. Herein, while the suspension housing 53 is configured as a separate member from the wheel house inner 51, these may be configured as an integrated member.

Figure 5:
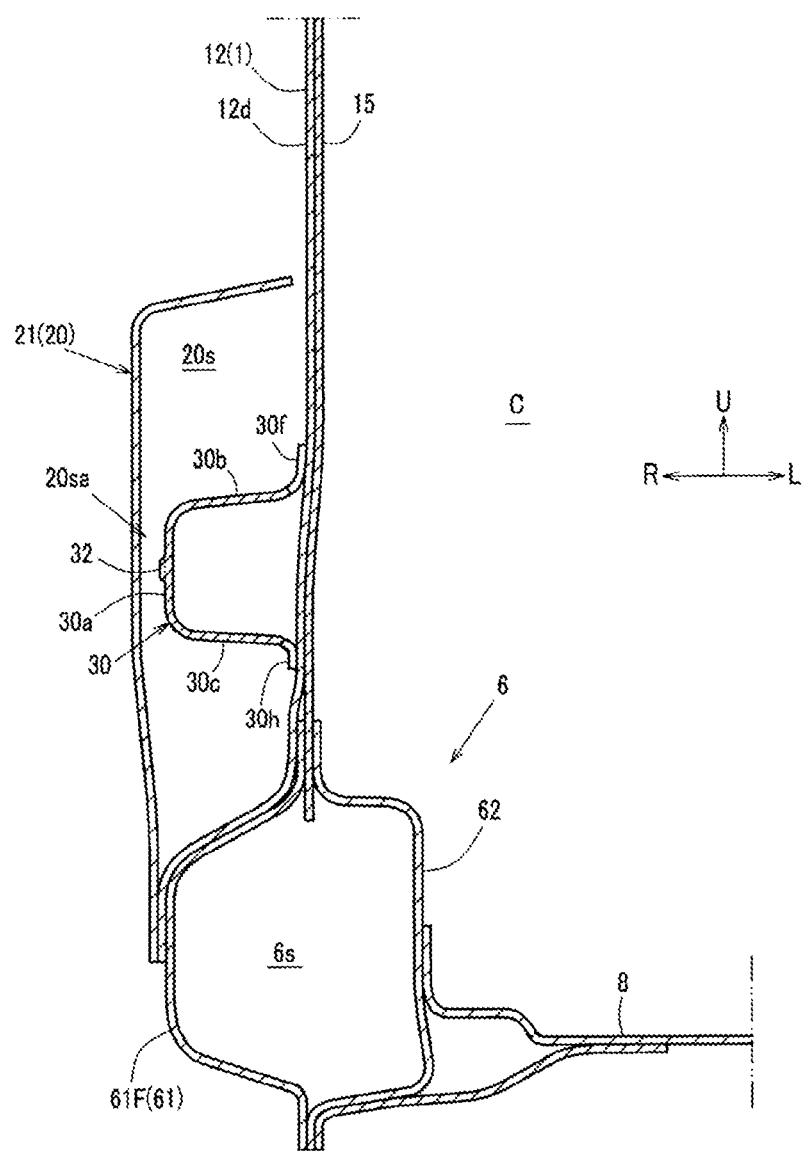
FIG. 5 is a sectional view taken along line B-B of FIG. 3.

As shown in FIGS. 1-5, the side sills 6 extend in the longitudinal direction at right-and-left both-end positions of a vehicle-body lower end portion, and, especially as shown in FIG. 5, each of the side sills 6 comprises a side sill outer 61 which has a hat-shaped cross section opened to the inward side in the vehicle width direction and a side sill inner 62 which has a hat-shaped cross section opened to the outward side in the vehicle width direction.

Herein, a lower end portion of the above-described side panel 15 is provided to be interposed between the side sill outer 61 and the side sill inner 62 at an upper end portion of the side sill 6 (see FIG. 5).

Further, as shown in FIGS. 1-4 and 7, the side sill outer 61 comprises at least two members of a side-sill-outer front portion 61F which constitutes a front portion thereof and a side-sill-outer rear portion 61R which extends rearwardly from a rear end portion of the side-sill-outer front portion 61F, which are integrated or formed integrally.

A lower portion (base portion) of the hinge pillar 1 is joined to a front portion of the side sill 6 (see FIGS. 1-5). Specifically, as shown in FIG. 2, the lower portion of the hinge pillar 1 is formed such that its longitudinal width becomes wider as it goes downwardly, and joined to an upper part of the front portion of the side sill 6 such that it extends across a joint portion 61C of the side-sill-outer front portion 61F and the side-sill-outer rear portion 61R.

Thus, in the present embodiment, the side sill 6 is provided to protrude forwardly, beyond the front face portion 12b of the hinge pillar 1, up to a rear lower end of the wheel house outer 52 as shown in FIG. 3. Further, a lower end portion (base portion) of the connecting reinforcement 20 is joined to an upper part of a forward protrusion portion 61Fa (see FIG. 1 particularly) which corresponds to a front part of the side-sill-outer front portion 61F which is positioned on the forward side of the front face portion 12b of the hinge pillar 1 (see FIG. 5).

Thereby, the lower portion of the connecting reinforcement 20 is reinforced by the side-sill-outer front portion 61F where the lower end portion of the hinge pillar 1 and the lower end portion of the connecting reinforcement 20 are joined, so that decreasing of the retreating speed of the front wheel by means of the connecting reinforcement 20 in the small-overlap collision of the vehicle can be further attained.

The side-sill-outer front portion 61F of the present embodiment has a thinner plate thickness than the side-sill-outer rear portion 61R, so that smooth transmission of a collision load from the hinge pillar 1 and the connecting reinforcement 20 to the side sill 6 in a frontal collision of the automotive vehicle is attained.

Herein, in the automotive vehicle in which the front-drive rear-drive (FR) type is adopted like the present embodiment, it is generally preferable that a gravity center of the vehicle body be set on a center line, in the longitudinal direction, of the vehicle body from viewpoints of the vehicle-body controllability.

In the automotive vehicle of the present embodiment, a distance, in the vehicle longitudinal direction, between the front face portion 12b of the hinge pillar 1 and the rear face portion 52R of the wheel house outer 52 is set to be relatively long so that the longitudinally-arranged engine, not illustrated, can be positioned as rearwardly as possible from a center position of the wheel house 5 in the engine room E, compared to a case of an automotive vehicle equipped with a laterally-arranged engine.

As shown in FIGS. 1, 3 and 4, the connecting reinforcement 20 is provided between the hinge pillar 1 and the wheel house 5 which has the long distance, in the vehicle longitudinal direction, therebetween as described above.

The connecting reinforcement 20 is constituted by a wheel-house reinforcing member 21 which reinforces at least around a rear face of the wheel house 5 and the rear face portion 52R of the wheel house outer 52 which constitutes a front face portion of the connecting reinforcement 20, and attached to the side panel 15 and an outward face, in the vehicle width direction, of the wheel house inner 51 from the outward side in the vehicle width direction such that this connecting reinforcement 20 extends, in the longitudinal direction, between the side panel 15 and the outward face of the wheel house inner 51.

Thus, as shown in FIGS. 5 and 6, the connecting reinforcement 20 is configured to have a closed-cross section space 20s extending in its extension direction therein by the wheel-house reinforcing member 21, the rear face portion 52R of the wheel house outer 52, the side panel 15, the wheel house inner 51, and others.

Further, as shown in FIGS. 1, 3 and 4, the connecting reinforcement 20 is provided at a corner portion located in front of the hinge pillar 1 and below the apron-reinforcement front portion 4F in a vehicle side view such that it interconnects the hinge pillar 1 and the apron reinforcement 4.

As shown in FIGS. 3 and 4, the wheel-house reinforcing member 21 comprises a vertical portion $21x$ which is positioned at its lower side and primarily extends in the vertical direction along the hinge pillar 1 and a slant portion $21y$ which is positioned at its upper side and primarily extends obliquely upwardly-and-forwardly from a forward-side corner portion of an upper part of the vertical portion $21x$, which are formed integrally. Thus, this wheel-house reinforcing member 21 is configured as a whole to extend along the rear face portion 52R of the wheel house outer 52 in the vehicle side view.

Specifically, as shown in FIGS. 3, 4 and 6, the wheel-house reinforcing member 21 comprises a side face portion $21a$ which forms an outward-side face, in the vehicle width direction, thereof over a range from the vertical portion $21x$ to the slant portion $21y$ and a rear face portion $21e$ which extends inwardly in the vehicle width direction from a rear edge of the slant portion $21y$ of the side face portion $21a$ (see FIGS. 3 and 4). Herein, a front edge of the side face portion $21a$ is formed in an arch shape such that it is curved upwardly and forwardly so as to correspond to an outward edge, in the vehicle width direction, of the rear face portion 52R of the wheel house outer 52 (see FIG. 1).

Moreover, the wheel-house reinforcing member 21 comprises a side-face front-edge flange portion $21b$ which extends outwardly in the vehicle width direction from the front edge of the side face portion $21a$, a side-face upper-front-edge flange portion $21c$ (see FIGS. 3 and 4) which extends forwardly and upwardly from a front upper edge of the side face portion $21a$, and a side-face rear-edge flange portion $21d$ (see the same figures) which extends rearwardly from a rear edge of the vertical portion $21x$ of the side face portion $21a$, which are formed integrally. The wheel-house reinforcing member 21 further comprises a rear-face upper-edge flange portion $21f$ (see the same figures) which extends forwardly from an upper end of the rear face portion $21e$, a rear-face inward-edge flange portion $21g$ (see the same figures) which extends upwardly from an inward end, in the vehicle width direction, of the rear face portion $21e$, and a rear-face lower-edge flange portion $21h$ (see the same figures) which extends downwardly from a rear lower end of the rear face portion $21e$, which are formed integrally.

The wheel-house reinforcing member 21 is joined to respective vehicle-body-side structure members to which the above-described flange portions correspond by spot welding or the like. Specifically, the side-face front-edge flange portion $21b$ is joined to the flange portion $52Ra$ (see FIG. 6) which is provided at the outward edge, in the vehicle width direction, of the rear face portion 52R of the wheel house outer 52.

The side-face upper-front-edge flange portion $21c$ is joined to side faces of respective outward side faces, in the vehicle width direction, of a rear lower portion of the apron-reinforcement front portion 4F and a front lower portion of the apron-reinforcement rear portion 4R, and the rear-face upper-edge flange portion $21f$ is joined to a lower face of a front portion of the apron-reinforcement rear portion 4R. Thereby, the upper portion of the connecting reinforcement 20 is connected to a lower portion of a joint portion of a rear end of the apron-reinforcement front portion 4F to the apron-reinforcement rear portion 4R from a rearward side.

Further, as shown in FIGS. 3 and 4, the rear-face inward-edge flange portion $21g$ is joined to the side panel 15 and others, the side-face rear-edge flange portion $21d$ is joined to the side face portion $12a$ (see FIG. 6), and the rear-face lower-edge flange portion $21h$ is joined to the front face portion $12b$ of the hinge pillar 1.

Moreover, the lower portion of the connecting reinforcement 20, that is—respective lower portions of the wheel-house reinforcing member 21 and the rear face portion 52R of the wheel house outer 52 are joined to the forward protrusion portion 61Fa of the side sill outer 61.

Thereby, the closed-cross section space $20s$ is formed inside the connecting reinforcement 20 (between the wheel-house reinforcing member 21 and the rear face portion 52R of the wheel house outer 52 and others) (see FIGS. 5 and 6), so that the connecting reinforcement 20 is configured as a closed-cross section structure to reinforce at least around the rear face of the wheel house 5. The closed-cross section space $20s$ extends in the vertical direction along the rear face portion 52R of the wheel house outer 52 according to the extension direction of the connecting reinforcement 20.

As shown in FIGS. 2, 5 and 6, a gusset 30 is provided at a middle position, in the vertical direction, of the closed-cross section space $20s$ (at a boundary portion of the vertical portion $21x$ and the slant portion $21y$). This gusset 30 is a member provided to reduce a degree (amount) of the front wheel's retreating and coming into the cabin C in the small-overlap collision of the vehicle, which will be described later.

As shown in FIGS. 3 and 4, plural opening portions $23a$, $23b$, $23c$, $23d$, $24a$, $24b$ for welding through which a spot-welding gun is inserted are formed at the side face portion $21a$ of the wheel-house reinforcing member 21, which are located intensively at an upper part and a middle part, in the vertical direction, of the side face portion $21a$. Herein, illustration of the opening portion $23b$, $23d$ is omitted in FIG. 5.

The plural opening portions $23a$, $23b$, $23c$, $23d$ positioned at the middle part, in the vertical direction, of the side face portion $21a$ of the wheel-house reinforcing member 21 are the ones for welding the gusset 30 to the hinge pillar outer 12 and the side panel 15, which are formed around a portion of the side face portion $21a$ which corresponds to the gusset 30 in the vertical direction. That is, the middle part, in the vertical direction, of the side face portion $21a$ corresponds to a gusset-corresponding portion of the present invention.

In this embodiment, at the middle part of the side face portion $21a$ are formed the four opening portions of the upper-front side opening portion $23a$ which is formed in a circular shape at an upper-front position, the upper-rear side opening portion $23b$ which is formed in an elongated-hole shape extending obliquely upwardly-and-rearwardly at an upper-rear position, the lower-rear side opening portion $23d$ which is formed in the circular shape at a lower-rear position, and the lower-front side opening portion $23c$ which is formed in an elongated-hole shape extending in the vertical direction at a position located in front of and below the lower-rear side opening portion $23d$.

The opening portions $24a$, $24b$ provided at the upper part of the side face portion $21a$ are the ones for welding a lower end flange 4Ra (see FIG. 3) of the apron-reinforcement rear portion 4R to the side panel 15. In this embodiment, the two circular-shaped opening portions of the lower-side opening portion $24a$ and the upper-rear side opening portion $24b$ which are positioned longitudinally are provided at the upper part of the side face portion 21a.

As shown in FIGS. 3 and 4, the side face portion 21a is provided with thick portions 25 (an upper thick portion 25a, a middle thick portion 25b, and a lower thick portion 25c) which are respectively formed at the upper part, the middle part, and the lower-rear side part of the side face portion 21a. Herein, illustration of the thick portions 25 is omitted in FIGS. 5 and 6.

At the upper thick portion 25a are formed the above-described lower-side opening portion 24a and the above-described upper-rear side opening portion 24b, and respective peripheral portions of these opening portions 24a, 24b are reinforced by the upper thick portion 25a.

The upper thick portion 25a and the middle thick portion 25b are formed over a whole range, in the vehicle width direction, of the wheel-house reinforcing member 21, and a front-edge rib 26f which extends along a front edge of the side face portion 21a and a rear-edge rib 26r which extends along a rear edge of the side face portion 21 are provided between the upper thick portion 25a and the middle thick portion 25b so as to connect these thick portions 25a, 25b.

Plural connecting ribs 26a, 26b, 26c which interconnect the above-described ribs 26f, 26r are formed across a portion between these ribs 26f, 26r. In this embodiment, the connecting ribs 26a, 26b, 26c comprise three of the upper connecting rib 26a, the middle connecting rib 26b, and the lower connecting rib 26c.

An area enclosed by a lower edge of the upper thick portion 25a, the upper connecting rib 26a, and the front-edge rib 26f, an area enclosed by the upper connecting rib 26a, the middle connecting rib 26b, and the rear-edge rib 26r, an area enclosed by the middle connecting rib 26b, the lower connecting rib 26c, and the front-edge rib 26f, and an area enclosed by the lower connecting rib 26c, an upper edge of the middle thick portion 25b, and the rear-edge rib 26r are respectively constituted by truss structures Ta, Tb, Tc, Td which respectively have a nearly-triangular shape in the vehicle side view. These four truss structures Ta, Tb, Tc, Td are arranged along an extension direction of the slant portion 21y of the side face portion 21a.

By providing the plural truss structures Ta, Tb, Tc, Td between the upper thick portion 25a and the middle thick portion 25b as described above, the strength of the portion between these thick portions 25a, 25b is increased and also the weight reduction of the wheel-house reinforcing member 21 is attained, compared to a case where a whole part of the side face portion 21a is made thick.

Further, the upper-front side opening portion 23a and the upper-rear side opening portion 23b are formed at the middle thick portion 25b, so that the respective peripheral portions of the upper-front side opening portion 23a and the upper-rear side opening portion 23b are reinforced by the middle thick portion 25b. Meanwhile, the lower-front side opening portion 23c and the lower-rear side opening portion 23d are provided near below the middle thick portion 25b.

Herein, a triangular-shaped recess portion 27 is formed at a corner portion positioned in front of and below the middle thick portion 25b, and a lower portion of a lower edge of the middle thick portion 25b and a lower portion of a front edge of the middle thick portion 25b are formed in a rib shape so as to form the recess portion 27. By forming the recess portion 27 as described, the middle thick portion 25b attains the rigidity increase as well as the weight reduction.

A horizontal rib 26d which extends roughly horizontally, being spaced upwardly apart from the lower thick portion 25c, is provided at the lower part of the side face portion 21a of the wheel-house reinforcing member 21. This horizontal rib 26d is configured to have a longitudinal length which is nearly equal to the lower thick portion 25c. There is provided a vertical rib 26e which extends downwardly in the vertical direction from a front end of the horizontal rib 26d, passing through a front edge of the lower thick portion 25c.

Further, there is provided a slant rib 26s which extends obliquely upwardly-and-forwardly so as to connect a front end of the horizontal rib 26d and a lower portion of the middle thick portion 25b. This slant rib 26s extends such that it passes between the adjacent lower-front side opening portion 23c and the lower-rear side opening portion 23d.

The above-described horizontal rib 26d is provided below and in back of the lower-rear side opening portion 23d, and the vertical rib 26e is provided in back of and near the lower-front side opening portion 23c.

Thus, respective peripheral portions of the lower-front opening portion 23c and the lower-rear side opening portion 23d are reinforced by the horizontal rib 26d, the vertical rib 26e, the slant rib 26s, the middle thick portion 25b, and the lower thick portion 25c which are provided near these peripheral portions of the opening portions 23c, 23d.

As shown in FIGS. 2, 5 and 6, the gusset 30 is provided at a corner portion of the hinge pillar 1 and the side panel 15 in the closed-cross section space 20s of the connecting reinforcement 20, and welded to these members by spot welding or the like.

Specifically, the gusset 30 comprises a slant face portion 30a which extends obliquely outwardly-and-rearwardly as a front face hereof, an upper face portion 30b (see FIGS. 2 and 5) which extends inwardly (rearwardly) in the vehicle width direction from an upper end of the slant face portion 30a, a lower face portion 30c (see FIG. 5) which extends inwardly (rearwardly) in the vehicle width direction from a lower end of the slant face portion 30a, a front-edge flange portion 30d (see FIGS. 2 and 6) which extends forwardly from a front end (an inward end in the vehicle width direction) of the slant face portion 30a, a rear-edge flange portion 30e (see the same figure) which extends rearwardly from a rear end (an outward end in the vehicle width direction) of the slant face portion 30a, an upper-front flange portion 30f (see FIG. 2) which extends upwardly from an inward end, in the vehicle width direction, of the upper face portion 30b, an upper-rear flange portion 30g (see the same figure) which extends upwardly from a rear end of the upper face portion 30b, a lower-front flange portion 30h (see FIGS. 2 and 5) which extends downwardly from an inward end, in the vehicle width direction, of the lower face portion 30c, and a lower-rear flange portion 30i which extends downwardly from a rear end of the lower face portion 30c, which are formed integrally (see FIG. 2).

The front-edge flange portion 30d, the upper-front flange portion 30f, and the lower-front flange portion 30h are joined to the side panel 15 together. In this embodiment, respective rear portions of the upper-front flange portion 30f and the lower-front flange portion 30h are joined to the side panel 15 via the front-side flange portion 12d of the hinge pillar 1.

Further, the upper-rear flange portion 30g and the lower-rear flange portion 30i are joined to the front face portion 12b of the hinge pillar 1 together, and the rear-edge flange portion 30e is joined to the side face portion 12a of the hinge pillar 1.

As shown in FIGS. 2 and 6, an opening portion 31 is formed at the slant face portion 30a of the gusset 30. This opening portion 31 is, as shown in FIG. 6, located at a position of the slant face portion 30a which corresponds to the lower-rear side opening portion 23d (see FIG. 3) which is formed at the side face portion 21a of the wheel-house reinforcing member 21 in the vehicle side view, and a spot-welding gun is insertable into the lower-rear side opening portion 23d and the opening portion 31. Further, as shown in FIGS. 2, 5 and 6, a rib 32 which extends, in the longitudinal direction, from a rear end of the slant face portion 30a including a peripheral portion of the opening portion 31 up to the front-edge flange portion 30d is provided at the slant face portion 30a.

As shown in FIG. 6, the gusset 30 is arranged such that the slant face portion 30a faces the rear face portion 52R of the wheel house outer 52 positioned on the forward side and the side face portion 21a positioned on the outward side in the vehicle width direction via a gap space 20sa which forms a part of the closed-cross section space 20s of the connecting reinforcement 20 in a state where the gusset 30 is arranged in the closed-cross section space 20s of the connecting reinforcement 20.

The gap space 20sa is configured to have a nearly-triangular shaped closed cross section which is enclosed by the slant face portion 30a of the gusset 30, the rear face portion 52R of the wheel house outer 52, and the side face portion 21a in the sectional view perpendicular to the vertical direction at a position which corresponds to the gusset 30, in the vertical direction, in the closed-cross section space 20sa of the connecting reinforcement 20.

The gusset 30 is located substantially at the same level as the lower side-door attachment portion 13b provided at the side face portion 12a of the hinge pillar 1 (see FIG. 2).

Herein, a portion of the hinge pillar 1 which corresponds to the lower side-door attachment portion 13b in the vertical direction is formed firmly by providing the hinge reinforcement 10 in the closed-cross section space is as described above. Thus, by providing the gusset 30 at the portion of the hinge pillar 1 located substantially at the same level as the lower side-door attachment portion 13b and also right in front of the portion corresponding to the lower side-door attachment portion 13b, the retreating of the front wheel together with the hinge reinforcement 10 can be effectively suppressed.

As described above, the front vehicle-body structure of the automotive vehicle of the present embodiment comprises the hinge pillar 1 extending in the vertical direction, the wheel house 5 provided to be spaced forwardly apart from the hinge pillar 1 (see FIGS. 1-3), the connecting reinforcement 20 provided between the hinge pillar 1 and the wheel house 5 and constituted by the closed-cross section structure to reinforce at least around the rear face of the wheel house 5 (see FIGS. 1, 3-6), the connecting reinforcement 20 extending in the vertical direction along the rear face portion 52R of the wheel house outer 52 of the wheel house 5 and having the closed-cross section space 20s, in the sectional view perpendicular to the vertical direction, inside thereof (see FIGS. 5 and 6), and the gusset 30 provided in the closed-cross section space 20s, the gusset 30 including the slant face portion 30a which is provided at the front face thereof and configured to extend obliquely rearwardly-and-outwardly (see FIGS. 2, 5 and 6), wherein the gap space 20sa which forms a part of the closed-cross section space 20s is provided between the slant face portion 30a and the rear face portion 52R of the wheel house outer 52 as a constituting face (front face) of the connecting reinforcement 20 which is provided on the side of the wheel house 5 (on the forward side) so as to face the slant face portion 30a (see FIG. 6).

According to this structure, since the connecting reinforcement 20 is provided in front of the hinge pillar 1, the gusset 30 having the slant face portion 30a is provided in the closed-cross section space 20s formed inside the connection reinforcement 20, and the gap space 20sa forming a part of the closed-cross section space 20s is provided between the slant face portion 30a and the rear face portion 52R of the wheel house outer 52, the front wheel retreating in the small-overlap collision can be received by the rear face portion 52R and the side face portion 21a as the constituting face of the connection reinforcement 20 at an earlier timing than the hinge pillar 1 and thereby the collision load from the retreating front wheel which is caused by the connecting reinforcement 20 collapsing by a distance of the gap space 20sa generated between these elements 52R, 21a and the slant face portion 30a of the gusset 30 can be absorbed.

Thereby, the retreating speed of the front wheel can be decreased. Further, the collision load from the wheel house 5 is so deflected outwardly in the vehicle width direction by the slant face portion 30a of the gusset 30 that the front wheel retreating can be securely made to glance off. Thus, the retreating of the front wheel can be suppressed in the small-overlap collision.

Specifically, there is a concern in a case where the gusset 30 is provided in the closed-cross section space is of the hinge pillar 1 that the retreating front wheel may not be received by this gusset 30 or the hinge pillar 1 at the early timing especially in the front vehicle-body structure of the automotive vehicle in which the distance between the hinge pillar 1 and the wheel house 5 is long, so that the appropriate glancing-off of the front wheel may not be attained.

For example, there is a concern that the front wheel which retreats, rotating around a support point of the suspension, in the small-overlap collision may not hit against the hinge pillar properly, so that the front wheel may improperly come into the engine room E or toward the dash panel 2 at a position located in front of the hinge pillar 1.

Meanwhile, according to the above-described present embodiment, the front wheel retreating in the small-overlap collision is so received before its hitting against the hinge pillar 1 that the collision load can be absorbed properly, and also the glancing-off of the front wheel can be securely attained by the gusset 30.

Further, in the present embodiment, the opening portions 23a, 23b, 23c, 23d which are configured to be opened from the closed-cross section space 20s to the outside of the connecting reinforcement 20 are formed at the gusset-corresponding portion of the side face portion 21a, as the constituting face of the connecting reinforcement 20, which faces the gusset 30 in the vertical direction, and the horizontal rib 26d, the vertical rib 26e, the slant rib 26s, the middle thick portion 25b, and the lower thick portion 25c, as the reinforcing portions, are provided around the opening portions 23a, 23b, 23c, 23d so as to reinforce the portion around these opening portions (see FIGS. 3 and 4).

According to this structure, the productivity or the maintenance performance of the front vehicle-body structure can be improved by using the opening potions 23a, 23b, 23c, 23d formed at the gusset-corresponding portion of the connecting reinforcement 20 as work openings for spot welding or service holes for maintenance, and also deterioration of the rigidity of the portion around these opening portions 23a, 23b, 23c, 23d, which may be caused by forming these opening portions 23a, 23b, 23c, 23d, can be suppressed by the reinforcing portions 26d, 26e, 26s, 25b, 25c.

Moreover, in the present embodiment, the upper thick portion 25a, the front-edge rib 26f, the rear-edge rib 26r, and the connecting ribs 26a, 26b, 26c, as reinforcing portions, are provided at the portion of the side face portion 21a, as the constituting face of the connecting reinforcement 20, which is located above the gusset-corresponding portion facing the gusset 30 in the vertical direction, i.e., at the portion located above the middle portion of the side face portion 21 in the vertical direction, so as to reinforce the portion located above the gusset-corresponding portion.

According to this structure, the decreasing of the retreating speed of the front wheel by means of the connecting reinforcement 20 can be attained further by reinforcing the portion of the connecting reinforcement 20 located above the gusset-corresponding portion by means of the reinforcing portions 25a, 26f, 26r, 26a, 26b, 26c.

Also, in the present embodiment, the lower thick portion 25c, the vertical rib 26e, and the side-sill-outer front portion 61F to which the lower portion of the connecting reinforcement 20 is joined, as the reinforcing portions, are provided at the portion of the side face portion 21a, as the constituting face of the connecting reinforcement 20, which is located below the gusset-corresponding portion facing the gusset 30 in the vertical direction, i.e., at the portion located below the middle portion of the side face portion 21 in the vertical direction, so as to reinforce the portion located below the gusset-corresponding portion.

According to this embodiment, the decreasing of the retreating speed of the front wheel by means of the connecting reinforcement 20 can be attained further by reinforcing the portion of the connecting reinforcement 20 located below the gusset-corresponding portion by means of the reinforcing portions 25c, 26e, 61F.

The present invention should not be limited to the above-described embodiment and any other modifications or improvements may be applied within the scope of a spirit of the present invention.

What is claimed is:

1. A front vehicle-body structure of a vehicle, comprising:
   a hinge pillar extending in a vertical direction;
   a wheel house provided to be spaced forwardly apart from the hinge pillar;
   a gusset provided between the hinge pillar and the wheel house, the gusset including a slant face portion which is provided at a front face thereof and configured to extend obliquely rearwardly-and-outwardly, an upper face portion which extends rearwardly in the vehicle width direction from an upper end of the slant face portion, and a lower face portion which extends rearwardly in the vehicle width direction from a lower end of the slant face portion; and
   an impact absorbing member which is provided in a vicinity of the gusset and configured to absorb impact which the gusset receives from a front wheel retreating in a small-overlap collision of the vehicle,
   wherein the upper face portion of the gusset and the lower face portion of the gusset are joined to a front face portion of the hinge pillar.

2. The lower vehicle-body structure of the vehicle of claim 1, wherein said impact absorbing member is constituted by a closed-cross section structure to reinforce at least around a rear face portion of said wheel house, said closed-cross section structure extends in the vertical direction along the rear face portion of said wheel house and has a closed-cross section space, in a sectional view perpendicular to the vertical direction, inside thereof, said gusset is provided in said closed-cross section space, and a gap space which forms a part of said closed-cross section space is provided between said slant face portion and a constituting face of said closed-cross section structure which is provided on a side of said wheel house so as to face the slant face portion.

3. The lower vehicle-body structure of the vehicle of claim 2, wherein an opening portion is formed at a gusset-corresponding portion of the constituting face of said closed-cross section structure which faces said gusset in the vertical direction, the opening portion being configured to be opened from said closed-cross section space to an outside of the closed-cross section structure, and a reinforcing portion is provided around said opening portion formed at the gusset-corresponding portion so as to reinforce a portion around the opening portion.

4. The lower vehicle-body structure of the vehicle of claim 2, wherein a reinforcing portion is provided at a portion of the constituting face of said closed-cross section structure which is located above a gusset-corresponding portion of the constituting face of said closed-cross section structure which faces said gusset in the vertical direction so as to reinforce said portion located above said gusset-corresponding portion.

5. The lower vehicle-body structure of the vehicle of claim 3, wherein a reinforcing portion is provided at a portion of the constituting face of said closed-cross section structure which is located above said gusset-corresponding portion so as to reinforce said portion located above the gusset-corresponding portion.

6. The lower vehicle-body structure of the vehicle of claim 2, wherein a reinforcing portion is provided at a portion of the constituting face of said closed-cross section structure which is located below a gusset-corresponding portion of the constituting face of said closed-cross section structure which faces said gusset in the vertical direction so as to reinforce said portion located below said gusset-corresponding portion.

7. The lower vehicle-body structure of the vehicle of claim 3, wherein a reinforcing portion is provided at a portion of the constituting face of said closed-cross section structure which is located below said gusset-corresponding portion so as to reinforce said portion located below the gusset-corresponding portion.

8. The lower vehicle-body structure of the vehicle of claim 4, wherein a reinforcing portion is provided at a portion of the constituting face of said closed-cross section structure which is located below a gusset-corresponding portion of the constituting face of said closed-cross section structure which faces said gusset in the vertical direction so as to reinforce said portion located below said gusset-corresponding portion.

9. The lower vehicle-body structure of the vehicle of claim 5, wherein a reinforcing portion is provided at a portion of the constituting face of said closed-cross section structure which is located below said gusset-corresponding portion so as to reinforce said portion located below the gusset-corresponding portion.

10. The lower vehicle-body structure of the vehicle of claim 1, wherein
    the upper face portion extends inwardly in the vehicle width direction from the upper end of the slant face portion,
    the lower face portion extends inwardly in the vehicle width direction from the lower end of the slant face portion, and
    the upper face portion and the lower face portion are joined to a side panel.

11. The lower vehicle-body structure of the vehicle of claim 1, wherein the gusset is provided at a corner portion of the hinge pillar and a side panel in a closed-cross section space of a connecting reinforcement.

12. The lower vehicle-body structure of the vehicle of claim 1, wherein
   a rib is provided at the slant face portion, and
   the rib extends, in the longitudinal direction, from a rear end of the slant face portion to a front-edge flange portion.

13. The lower vehicle-body structure of the vehicle of claim 1, wherein the gusset is located substantially at the same level as a lower side-door attachment portion provided at a side face portion of the hinge pillar.

* * * * *